US007516082B2

(12) United States Patent  (10) Patent No.: US 7,516,082 B2
Sanville et al.  (45) Date of Patent: Apr. 7, 2009

(54) SCHEDULING DELIVERY OF CHEMICAL PRODUCTS BASED ON A PREDICTED ESTIMATED TIME OF EXHAUSTION

(75) Inventors: Katherine Sanville, White Bear Lake, MN (US); David Robert Johnson, Woodbury, MN (US); Ronald Bruce Howes, Jr., Minneapolis, MN (US)

(73) Assignee: Ecolab Inc., St. Paul, MN (US)

( * ) Notice: Subject to any disclaimer, the term of this patent is extended or adjusted under 35 U.S.C. 154(b) by 1240 days.

(21) Appl. No.: 10/427,032

(22) Filed: Apr. 29, 2003

(65) Prior Publication Data

US 2004/0220844 A1  Nov. 4, 2004

(51) Int. Cl.
 G05B 19/418  (2006.01)
(52) U.S. Cl. ......................................................... 705/8
(58) Field of Classification Search ........................ None
 See application file for complete search history.

(56) References Cited

U.S. PATENT DOCUMENTS

| | | | |
|---|---|---|---|
| 4,482,785 A | 11/1984 | Finnegan et al. | |
| 4,509,543 A | 4/1985 | Livingston et al. | |
| 4,756,321 A | 7/1988 | Livingston et al. | |
| 4,845,486 A * | 7/1989 | Knight et al. | 340/618 |
| 4,872,451 A * | 10/1989 | Moore et al. | 606/72 |
| 5,014,211 A | 5/1991 | Turner et al. | |
| 5,038,807 A | 8/1991 | Bailey et al. | |
| 5,043,860 A | 8/1991 | Koether et al. | |
| 5,154,314 A * | 10/1992 | Van Wormer | 222/1 |
| 5,168,445 A * | 12/1992 | Kawashima et al. | 705/10 |
| 5,203,366 A | 4/1993 | Czeck et al. | 137/3 |
| 5,222,027 A | 6/1993 | Williams et al. | 700/239 |
| 5,272,638 A * | 12/1993 | Martin et al. | 455/456.5 |
| 5,345,379 A | 9/1994 | Brous et al. | 700/17 |
| 5,351,725 A * | 10/1994 | Suthergreen et al. | 141/1 |
| 5,619,560 A * | 4/1997 | Shea | 379/106.04 |
| 5,681,400 A | 10/1997 | Brady et al. | 134/18 |
| 5,694,323 A | 12/1997 | Koropitzer et al. | 705/400 |
| 5,724,261 A | 3/1998 | Denny et al. | |
| 5,745,381 A | 4/1998 | Tanaka et al. | 702/182 |
| 5,757,664 A | 5/1998 | Rogers et al. | 700/232 |
| 5,758,313 A * | 5/1998 | Shah et al. | 455/456.2 |
| H1743 H * | 8/1998 | Graves et al. | 700/236 |
| 5,826,749 A | 10/1998 | Howland et al. | 222/1 |

(Continued)

OTHER PUBLICATIONS

Stewart, William Royce Jr., New Algorithms for Deterministic and Stochastic Vehicle Routing Problems University of Maryland, 1981, AAT 8202876, Abstract.*

(Continued)

Primary Examiner—Scott L. Jarrett
(74) Attorney, Agent, or Firm—Shumaker & Sieffert, P.A.

(57) ABSTRACT

A method and system for routing a delivery vehicle to a chemical usage facility is disclosed. The chemical usage facility includes one or more chemical dispense systems that dispense one or more chemical product. The quantity of each chemical product remaining is measured and communicated to a central management facility. The central management facility analyzes a trend in product usage to predict when the product quantity will reach a threshold depletion point. The chemical usage facility is scheduled on the route according to the predicted time associated with the threshold depletion point.

61 Claims, 8 Drawing Sheets

U.S. PATENT DOCUMENTS

| | | | | |
|---|---|---|---|---|
| 5,839,097 | A | 11/1998 | Klausner | 340/825.69 |
| 5,875,430 | A | 2/1999 | Koether | |
| 5,939,974 | A | 8/1999 | Heagle et al. | |
| 5,945,910 | A | 8/1999 | Gorra | |
| 5,956,487 | A | 9/1999 | Venkatraman et al. | |
| 5,967,202 | A | 10/1999 | Mullen et al. | 141/104 |
| 5,975,352 | A | 11/1999 | Spriggs et al. | 222/23 |
| 5,980,090 | A | 11/1999 | Royal et al. | 700/241 |
| 5,983,198 | A * | 11/1999 | Mowery et al. | 705/22 |
| 6,003,070 | A | 12/1999 | Frantz | |
| 6,061,668 | A | 5/2000 | Sharrow | 705/400 |
| 6,133,555 | A | 10/2000 | Brenn | |
| 6,321,204 | B1 | 11/2001 | Kazami et al. | 705/7 |
| 6,330,499 | B1 | 12/2001 | Chou et al. | |
| 6,336,362 | B1 * | 1/2002 | Duenas | 73/313 |
| 6,343,251 | B1 | 1/2002 | Herron et al. | |
| 6,356,205 | B1 | 3/2002 | Salvo et al. | |
| 6,377,868 | B1 | 4/2002 | Gardner | 700/236 |
| 6,510,384 | B2 * | 1/2003 | Okano | 701/209 |
| 6,609,101 | B1 * | 8/2003 | Landvater | 705/10 |
| 6,715,514 | B2 * | 4/2004 | Parker et al. | 141/1 |
| 6,847,305 | B1 * | 1/2005 | Buck | 340/870.07 |
| 6,975,937 | B1 * | 12/2005 | Kantarjiev et al. | 701/117 |
| 7,155,349 | B1 * | 12/2006 | Souluer | 702/55 |
| 7,177,825 | B1 * | 2/2007 | Borders et al. | 705/26 |
| 7,201,290 | B2 * | 4/2007 | Mehus et al. | 222/77 |
| 7,228,199 | B2 * | 6/2007 | Wallace | 700/236 |
| 7,292,993 | B2 * | 11/2007 | Uzzo et al. | 705/28 |
| 2001/0039501 | A1 | 11/2001 | Crevel et al. | |
| 2001/0047214 | A1 | 11/2001 | Cocking et al. | |
| 2001/0053939 | A1 | 12/2001 | Crevel et al. | |
| 2001/0054038 | A1 | 12/2001 | Crevel et al. | |
| 2003/0191558 | A1 * | 10/2003 | Arellano | 700/237 |

OTHER PUBLICATIONS

Fisher, Marshall et al., A Computerized Vehicle Routing Application Interfaces vol. 12, No. 4, Aug. 1982, pp. 42-52.*

Golden, Bruce L. et al., Computerized Vehicle Routing in the Soft Drink Industry Operations Research, vol. 35, No. 1, Jan.-Feb. 1987, pp. 6-17.*

Bodin, Lawrence, Twenty Years of Routing and Scheduling Operations Research, vol. 38, No. 4, Jul.-Aug. 1990, pp. 571-579.*

ROADNET—Daily Route Editor Manual Roadnet Technologies Inc., 1996.*

Bell, Walter J. et al., Improving the Distribution of Industrial Gases with an On-line Computerized Routing and Scheduling Optimizer, Interfaces vol. 13, No. 6, Dec. 1983.*

Meyer, Christopher, Chaos and the IS executive Computer World, May 1996.*

Slywotzky, Adrian J., Concrete Solution—Company Operations The Industry Standard, Aug. 28, 2000.*

Berman, Oded et al., Deliveries in an Inventory/Routing Problem Using Stochastic Dynamic Programming Transportation Science, vol. 35, No. 2, May 2001.*

Campbell, A. and M. Savelsbergh, Inventory Routing in Practice, The Vehicle Routing Problem SIAM Monographs on Discrete Mathematics and Applications, 2002.*

Herer, Yale T. et al., The metered inventory routing problem, an integrative heuristic algorithm International Journal Production Ecomonics, vol. 51, 1997.*

Dror, Moshe et al., Inventory Routing: Operational Design Journal of Business Logistics, vol. 9, No. 2, 1988.*

Campbell, Melissa Ann, Inventory Routing Geogria Institute of Technology, Jul. 2000.*

*We'd like to make a couple of things perfectly Clear*, Aquabalance Pool and Spa Management, Ecolab brochure, 1998 Ecolab Inc.

*White Paper*, ECOLAB BALANCER. COM, MRE Jun. 4, 1997.

*Relax, We've Got Your Pool Concerns Under Control*, Ecolab Water Care Services, 1998 Ecolab, Inc.

* cited by examiner

SCHEDULING DELIVERY OF CHEMICAL PRODUCTS BASED ON A PREDICTED ESTIMATED TIME OF EXHAUSTION

TECHNICAL FIELD

The invention relates generally to chemical usage systems, and more particularly, to monitoring and controlling route scheduling of chemical delivery to chemical usage facilities.

BACKGROUND OF THE INVENTION

Commercial cleaning systems are used in various industries. For example, in the restaurant industry, warewashing systems are employed to rapidly wash large quantities of eating utensils, plates, pots, pans, glassware, etc. As another example, in the hotel industry clothes/linen washers are employed to rapidly wash large quantities of hotel linens, towels, clothing, and the like. In operation, commercial cleaning systems typically dispense one or more chemical products through a dispenser attached to the cleaning system. These commercial cleaning systems are typically called chemical usage systems due to the fact that these systems utilize chemicals to perform various types of tasks at various types of facilities. As such, the facilities where these systems are maintained are commonly referred to as chemical usage facilities.

A user of a commercial cleaning system may contract with a chemical vendor company to handle the replenishment of chemical products upon exhaustion. The vendor employs delivery personnel to deliver new chemical products to various geographically dispersed chemical usage facilities. For a number of reasons, determining when the systems have exhausted the chemical product has been difficult for the vendors. As such, vendors have had difficulty in optimally determining when and where to dispatch delivery personnel among its multiple geographically dispersed customers.

Traditionally, chemical vendors have not had sophisticated monitoring or communications systems for interacting with geographically-dispersed chemical usage facilities, and yet it is important that the vendors have advanced notice of imminent chemical product exhaustion to optimally route chemical delivery. Vendors typically require advance notice prior to chemical product exhaustion so that the dispatch personnel can schedule their delivery routes in such a way that the user receives a new chemical product without any downtime. If a cleaning system exhausts the chemical product without a refill available (i.e., no refill has been delivered prior to exhaustion), then the user may not be able to properly clean the linens, eating utensils, or other items, which may result in increased costs or reduced revenue for the user.

The amount of product that remains at a chemical usage facility depends on numerous factors, such as wash cycles per day, system operation/maintenance, type of chemical used, usage rates, and operator error. Indeed, it is often difficult to measure quantities of chemical product remaining, particularly if the chemical product is in solid form. For example, a solid block of chemical product that ratably dissolves on a per wash-cycle basis cannot be directly measured in terms of weight, mass, size, or otherwise, using conventional commercial cleaning systems.

It is with the foregoing considerations that embodiments of the present invention have been developed.

SUMMARY OF THE INVENTION

In accordance with the present invention, the above and other problems are solved by a route scheduling system that schedules chemical deliveries to chemical usage facilities based on a predicted time of chemical exhaustion. Generally, the route scheduling system estimates a time of exhaustion of chemical product at a chemical usage facility and routes product delivery based on the estimated exhaustion time and location. One embodiment includes obtaining a measurement related to the amount of a chemical product remaining at a chemical usage facility. The measurement is used to determine the estimated time of chemical exhaustion at that chemical usage facility. A schedule of cleaning sites is updated according to the estimated product exhaustion time. The updated schedule may be transmitted to a chemical product delivery vehicle responsible for delivering the chemical product to the facility.

In accordance with an embodiment, the present invention is a method for routing delivery of chemical products to chemical usage facilities. The method includes an act of determining usage of a first chemical product during a plurality of specified periods in time at a first chemical usage facility. The usage is then analyzed by the method to predict an estimated time of exhaustion of the first chemical product. The method then schedules delivery of the first chemical product to the first chemical usage facility prior to the estimated time of exhaustion of the first chemical product.

The act of determining usage of the first chemical product includes calculating a quantity of chemical product dissolved during each of the specified periods in time in accordance with an embodiment of the present invention. If the first chemical product is in solid form, calculating quantities of the first chemical product dissolved may entail taking measurements indirectly representing the amount of chemical product dissolved during each specified period in time. These indirect measurements are multiplied by a dissolution rate associated with the first chemical product in order to estimate a quantity of the first chemical product dissolved during each of the specified time periods. These quantities are then subtracted from a relative original quantity of the first chemical product to yield values indicative of the amount of chemical product remaining after each of the specified time periods. The remaining amount of chemical product after each of the specified periods in time is plotted on a time line to yield a trend line. The trend line is extrapolated to estimate the time of exhaustion and determine an optimal time for replenishment.

In accordance with yet another embodiment of the present invention, the indirect measurements relate to a count of wash cycles wherein an amount of a chemical product is dispensed in a wash process. The chemical product mixes with water for cleaning during each wash cycle. Wash cycles are counted and the count is transmitted to a remote server for analysis, along with a site identifier related to the location of the chemical usage facility. The wash count may be used to estimate a time when the chemical product will be exhausted. The remote server analyzes the time of exhaustion and the facility location relative to other chemical usage facilities' locations in order to schedule delivery of the chemical product to the chemical usage facility.

The invention may be implemented as a computer process, a computing system or as an article of manufacture, such as, a computer program product. The computer program product may be a solid state, non-volatile memory device or a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION

In the following description of the exemplary embodiment, reference is made to the accompanying drawings that form a part hereof, and in which is shown by way of illustration a specific embodiment in which the invention may be practiced. It is to be understood that other embodiments may be utilized as structural changes may be made without departing from the scope of the present invention.

Figure 1:
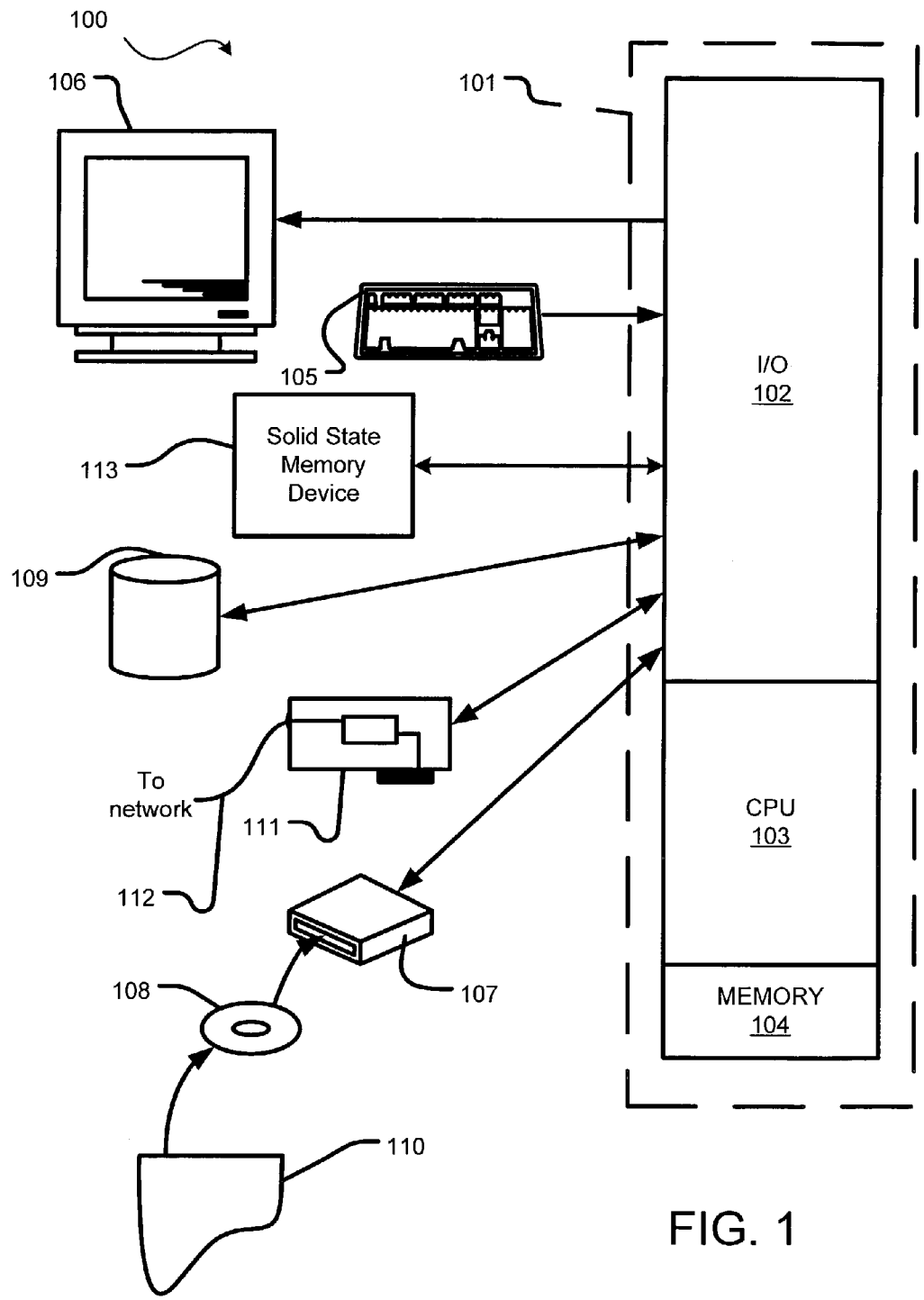
FIG. 1 depicts a block diagram of a suitable computing environment in which an embodiment of the present invention may be implemented.

FIG. 1 depicts a computing system 100 capable of executing a program product embodiment of the present invention. In such a system, data and program files may be input to the computing system 100, which reads the files and executes the programs therein. Some of the elements of a computing system 100 are shown in FIG. 1 wherein a control module, illustrated as a processor 101, is shown having an input/output (I/O) section 102, a microprocessor, or Central Processing Unit (CPU) 103, and a memory section 104. The present invention is optionally implemented in software or firmware modules loaded in memory 104 and/or stored on a solid state, non-volatile memory device 113, a configured CD-ROM 108 or a disk storage unit 109. As such, the computing system 100 is used as a "special-purpose" machine for implementing the present invention.

Each of the above-noted forms of data storage are broadly included within the definition of "computer program product" used throughout the specification and the claims. That is, generally stated, a computer program product of the present invention may be a solid state, non-volatile memory device or a computer storage media readable by a computer system and encoding a computer program of instructions for executing a computer process. In another embodiment, the computer program product may also be a propagated signal on a carrier readable by a computing system and encoding a computer program of instructions for executing a computer process.

The I/O section 102 is connected to a user input module 105, e.g., a keyboard, a display unit 106 and one or more program storage devices, such as, without limitation, the solid state, non-volatile memory device 113, the disk storage unit 109, and the disk drive unit 107. The user input module 105 is shown as a keyboard, but may also be any other type of apparatus for inputting commands into the processor 101. The solid state, non-volatile memory device 113 is an embedded memory device for storing instructions and commands in a form readable by the CPU 103. In accordance with various embodiments, the solid state, non-volatile memory device 113 may be Read-Only Memory (ROM), an Erasable Programmable ROM (EPROM), Electrically-Erasable Programmable ROM (EEPROM), a Flash Memory or a Programmable ROM, or any other form of solid state, non-volatile memory. In accordance with one embodiment, the disk drive unit 107 is a CD-ROM driver unit capable of reading the CD-ROM medium 108, which typically contains programs 110 and data. Computer program products containing mechanisms to effectuate the systems and methods in accordance with the present invention may reside in the memory section 104, the solid state, non-volatile memory device 113, the disk storage unit 109 or the CD-ROM medium 108.

In accordance with an alternative embodiment, the disk drive unit 107 may be replaced or supplemented by a floppy drive unit, a tape drive unit, or other storage medium drive unit. A network adapter 111 is capable of connecting the computing system 100 to a network of remote computers via a network link 112. Examples of such systems include SPARC systems offered by Sun Microsystems, Inc., personal computers offered by IBM Corporation and by other manufacturers of IBM-compatible personal computers, and other systems running a UNIX-based or other operating system. A remote computer may be a desktop computer, a server, a router, a network PC (personal computer), a peer device or other common network node, and typically includes many or all of the elements described above relative to the computing system 100. Logical connections may include a local area network (LAN) or a wide area network (WAN). Such networking environments are commonplace in offices, enterprise-wide computer networks, intranets, and the Internet.

In accordance with a program product embodiment of the present invention, software instructions stored on the solid state, non-volatile memory device 113, the disk storage unit 109, or the CD-ROM 108 are executed by the CPU. In this embodiment, these instructions may be directed toward communicating data between a client and a server, detecting product usage data, analyzing data, and generating reports. Data, such as products usage data, corporate data, and supplemental data generated from product usage data or input from other sources, may be stored in memory section 104, or on the solid state, non-volatile memory device 113, the disk storage unit 109, the disk drive unit 107 or other storage medium units coupled to the system 100.

In accordance with one embodiment, the computing system 100 further comprises an operating system and usually one or more application programs. Such an embodiment is familiar to those of ordinary skill in the art. The operating system comprises a set of programs that control operations of the computing system 100 and allocation of resources. The set of programs, inclusive of certain utility programs, may also provide a graphical user interface to the user. An application program is software that runs on top of the operating system software and uses computer resources made available through the operating system to perform application specific tasks desired by the user. In accordance with an embodiment, the operating system employs a graphical user interface wherein the display output of an application program is presented in a rectangular area on the screen of the display device 106. The operating system is operable to multitask, i.e., execute computing tasks in multiple threads, and thus may be any of the following: Microsoft Corporation's "WINDOWS 95," "WINDOWS CE," "WINDOWS 98," "WINDOWS 2000" or "WINDOWS NT" operating systems, IBM's OS/2 WARP, Apple's MACINTOSH SYSTEM 8 operating system, UNIX or LINUX with the X-windows graphical environment, etc.

In accordance with the practices of persons skilled in the art of computer programming, the present invention is described below with reference to acts and symbolic representations of operations that are performed by the computing system 100, e.g., the controller 410, the server computer 422 and client computer 424, unless indicated otherwise. Such acts and operations are sometimes referred to as being computer-executed. It will be appreciated that the acts and symbolically represented operations include the manipulations by the CPU 103 of electrical signals representing data bits causing a transformation or reduction of the electrical signal representation, and the maintenance of data bits at memory locations in the memory 104, the solid state, non-volatile memory device 113, the configured CD-ROM 108 or the storage unit 109 to thereby reconfigure or otherwise alter the operation of the computing system 100, as well as other processing signals. The memory locations where data bits are maintained are physical locations that have particular electrical, magnetic, or optical properties corresponding to the data bits.

The logical operations of the various embodiments of the present invention are implemented (1) as a sequence of computer-implemented steps running on a computing system, and/or (2) as interconnected machine modules within the computing system. The implementation is a matter of choice dependent on the performance requirements of the computing system implementing the invention. Accordingly, the logical operations making up embodiments of the present invention described herein are referred to alternatively as operations, acts, steps or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 2:
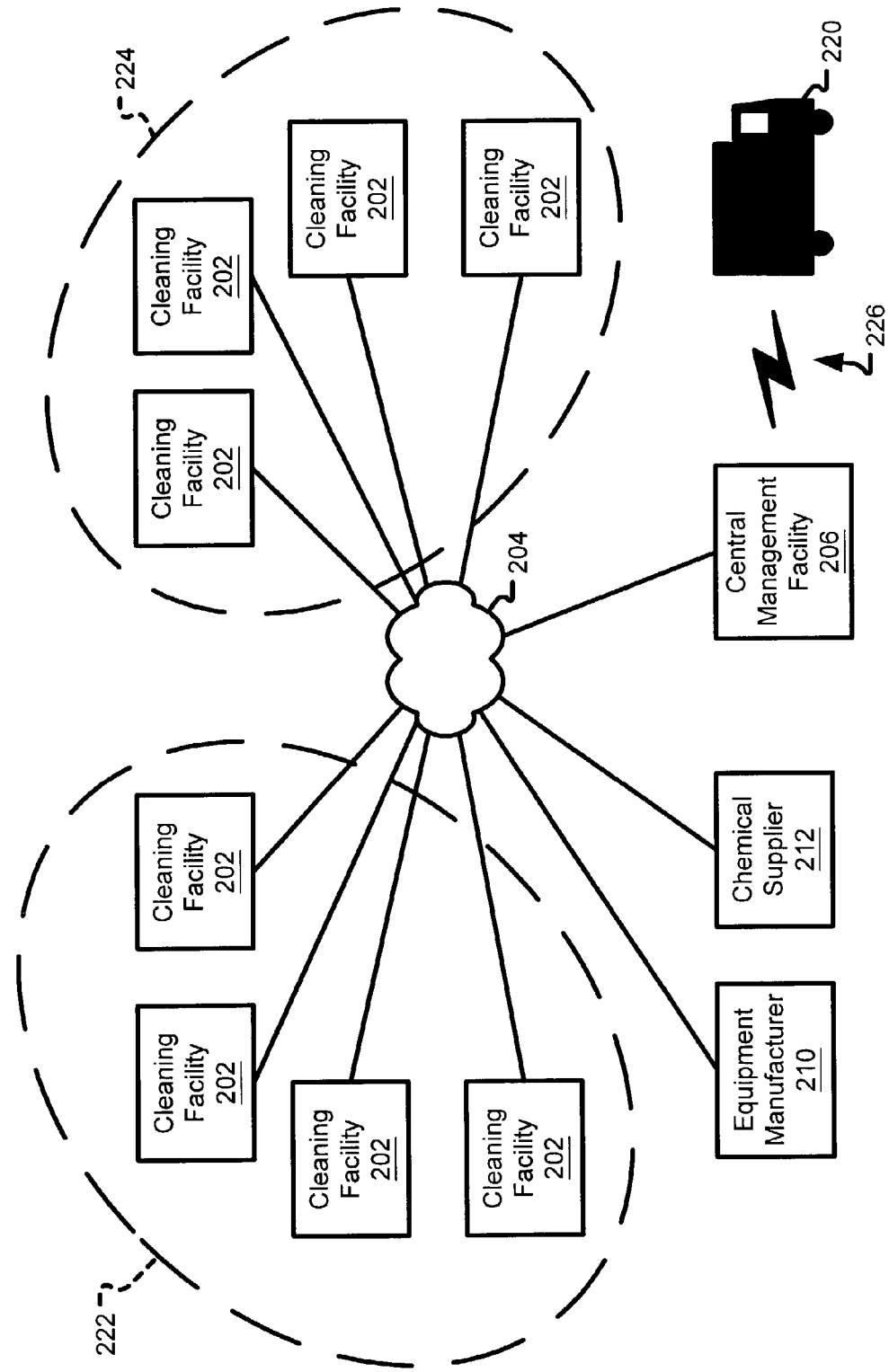
FIG. 2 illustrates an exemplary communications network showing remote chemical usage facilities connected by a communications network to a central management facility in an embodiment of the present invention.

FIG. 2 illustrates an exemplary environment of remote chemical usage facilities 202 connected by a communications network 204 to a central management facility 206 in an embodiment of the invention. The monitoring and control systems at each of the chemical usage facilities 202 collect chemical process data and some portion of environmental parameters, and furthermore control the operation of the processes (e.g., selections of chemicals used in the wash or alteration of wash sequences). Chemical usage facilities 202 are any type of industrial facility that utilizes chemical products in the performance of certain tasks. By way of example, and not limitation, a chemical usage facility 202 includes chemical dispense systems for use with one or more chemical usage systems, such as, without limitation, ware washers, car washes, washing machines, and others. Additionally, a chemical usage system may include a dispense system as part of the actual usage system, as the case with many ware washers. For clarity, the term "chemical dispense system" is used broadly herein to encompass either a combination of a chemical dispense system and a chemical usage system or a chemical usage system having an integrated chemical dispense system. It should be appreciated that each chemical usage facility 202 may include and/or utilize more than one chemical dispense system during a cleaning process.

Exemplary chemical process data may include data generated at the remote chemical usage facility 202, including without limitation raw chemical characteristic data (e.g., chemical levels, temperatures, and usage rates) generated by monitoring devices, analytical results derived from the raw chemical characteristic data at the remote chemical usage facility 202, and alarm indicators relating to chemical characteristic data. Exemplary environmental parameters include, without limitation, ambient temperature, local road construction information, weather reports, soil sample data, an anticipated schedule for chemical deliveries, sale information, etc. Exemplary sale information includes, for example, food and beverage revenue and point-of-sale (POS) information. Some or all of the process data and other environmental parameters may be made available or transmitted by the communications network 204 to offsite facilities, such as the central management facility 206. The communications network 204 further allows the transmission of control commands and other environmental parameters to the remote wash facilities 202. As shown in FIG. 2, process data and environmental parameters may also be transmitted or made available directly to an equipment manufacturer 210 and the chemical supplier 212. Furthermore, data may also be transmitted via a wireless communication link 226 to a service vehicle 220.

FIG. 2 also shows the chemical usage facilities 202 grouped into two regions 222 and 224. It should be understood that an operator may group chemical usage facilities 202 into any number of regions as necessary or convenient for efficient management. For example, chemical usage facilities 202 that are geographically proximate to each other (e.g. on one side of town) may be grouped into one region 222 while other facilities on the other side of town may be grouped into another region 224. Alternatively, facilities may be grouped by category (e.g., coin-operated, stand-alone, gas station, brand-name, wash system type, contract type, etc.).

It should be understood that the communications network 204 may utilize any number of communication technologies depending on functions required by the embodiment. Examples of specific technologies used in communications networks 204 contemplated include without limitation terrestrial, cellular, satellite, short-wave, and microwave connections to the Internet, directly between facilities using modems or other interface devices, or through other communications networks, such as local area networks or wide area networks. Any combination of these or other communications networks may be utilized and remain within the scope of the invention. Similarly, the communications network 204 is also shown as connected to a mobile service vehicle 220 via a wireless communication link 226. Alternatively, the service vehicle 220 may be connected to the communications network 204 through a dedicated connection to some facility, such as the central management facility 206, rather than receiving process data and environmental parameters directly from the network 204, without departing from the scope of the invention.

The equipment manufacturer 210 may receive process data, environmental parameters, or notifications (e.g., an order command) directly or indirectly from chemical usage facilities 202 or from the central management facility 206. This connection allows the equipment manufacturer 210 to schedule maintenance and repair activities based on the process data received from the distributed system. For example, if wash pressure is detected as decreasing over time, the equipment manufacturer 210 may schedule a repair technician to visit the corresponding chemical usage facility to repair or replace a pump or to patch leaks in the plumbing system.

Likewise, the chemical supplier 212 may receive the similar data and be alerted to any conditions at the chemical usage facilities 202 that may require action on the chemical supplier's part. For example, based on an aggregated determination of chemical levels of a given type in a region, the chemical supplier 212 may predict an increased or decreased need for a given chemical in the region, and thereby adjust its production schedule for that chemical accordingly.

In an embodiment, information is provided to the individuals at the equipment manufacturer 210, the chemical supplier 212, the central management facility 206 and the service vehicle 220 on a web browser implemented on a computer system local to the equipment manufacturer 210, the chemical supplier 212, the central management facility 206 and the service vehicle 220, respectively. In this embodiment, the network 204 may be an Intranet or the Internet.

Figure 3:
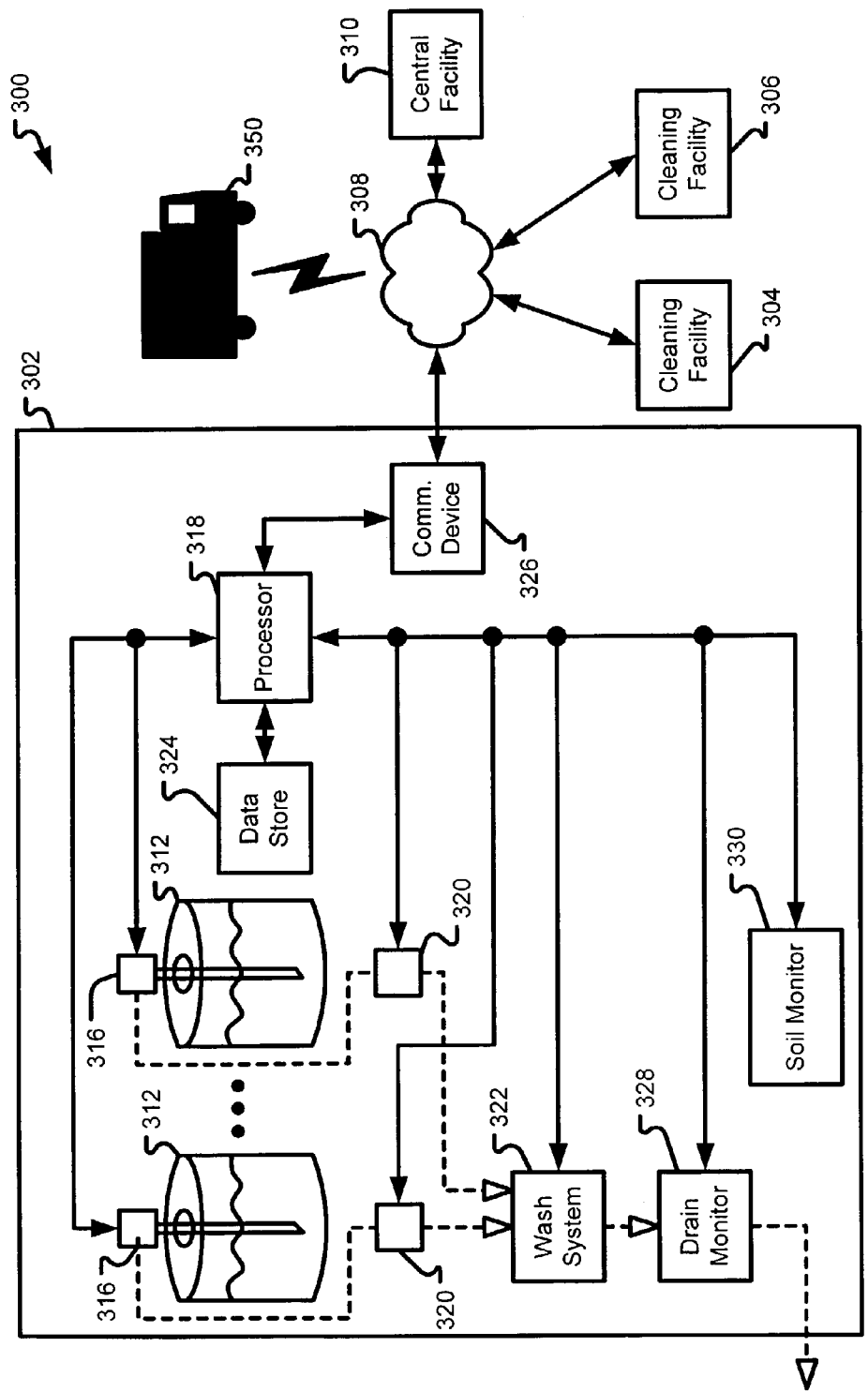
FIG. 3 illustrates an exemplary topology of chemical processes, monitoring devices, control devices, processing devices and communication devices relative to a chemical usage facility in an embodiment of the present invention.

FIG. 3 illustrates an exemplary topology of chemical processes, monitoring devices, control devices, processing devices, and communication devices at a remote chemical usage facility 302 in an embodiment of the present invention. Similar to the embodiment shown in FIG. 2, FIG. 3 illustrates the general environment 300 including three remote chemical usage facilities 302, 304, 306, connected via a communications network 308 to a central management facility 310. A communication line communicatively connecting the communications network 308 to a service vehicle 350 is also shown. A detailed view of the topology of an exemplary monitoring and control system in accordance with the present invention is shown within the remote chemical usage facility 302. Note that data communication connections are indicated by a solid line to distinguish them from process piping, which are indicated by dashed lines.

At any remote chemical usage facility 302, 304, 306 to which the present invention may be applied, there is at least one chemical process. Specific examples of chemical processes used at chemical usage facilities may include, without limitation, detergent storage and dispensing (whether the detergent is liquid or solid), water application, effluent disposal, and drying. For the purposes of this application, the exemplary "chemical processes" may also include operation of equipment necessary to deliver, maintain, measure, control and alter a chemical, including mechanical applicators, scrubbers, displays, fans, storage vessels or drums, mixers, valves, level sensors, pumps, heaters, coolers, and the like.

In the exemplary embodiment shown in FIG. 3, the processes are represented as a series of chemical storage containers, illustrated by the two storage containers 312 connected by an ellipsis, although it should be understood that the invention applies equally to any type of chemical or fluid process that is subject to electronic monitoring and control. Storage containers 312 are commonly used in many ware wash machines. In this embodiment, each storage container 312 consist of cleaning chemical(s) that dissolve when water from the chemical usage facility 302 runs over one or more blocks of solidified chemical(s) stored therein. Each chemical block dissolves ratably, meaning at a predetermined rate, for a specified water temperature and pressure. This "dissolution" rate at which the chemical block dissolves is known by the service provider, seller, or manufacturer of the chemical block. During a wash-cycle, the dissolved chemical is carried by the water over the item(s) to be washed, such as plates, dishes, eating utensils, and the like. It is to be understood that chemical products may be stored in the storage containers 312 in other forms, such as liquid, powder, etc. in other embodiments.

Associated with one more of the chemical processes is at least one monitoring device, depicted in the exemplary embodiment as level sensors 316 reporting the level of chemical product remaining in each storage container 312. The electronic level sensor 316 are capable of detecting the remaining amount of chemical product, which may be in a solid or liquid form, in the storage container 312 and (periodically or continuously, depending on the type of sensor used) communicating that process data to the controller 318. Such electronic level sensors 316 may include without limitation capacitance probes, infrared beams, weight scales and pressure sensors. It should be understood that the illustrated placement of the sensors 316 are merely exemplary and are not intended to limit the physical configuration of any monitoring devices in the system.

In some facilities, the volume of chemical product cannot be directly measured. In these facilities, indirect measurement may be used to determine how much chemical product remains and whether new chemical product is needed at the facility. As used herein, an indirect measurement is a measurement that is in units other than volume (if liquid product) or weight (if solid product) that directly indicates a volume or weight of chemical product remaining. In one embodiment, the controller 318 may be coupled to an "indirect measurement" sensor (not shown) for detecting information used to an indirectly measure the volume (if liquid product) or weight (if solid product) of chemical product(s) residing in each storage container 312.

An example of such an indirect measurement is the number of washes ("wash count") at the chemical usage facility 302. In the embodiment wherein the wash process is implemented by a ware washer, the number of washes is often referred to as a rack count, wherein there are a certain number of racks of ware (e.g., silverware, glassware, etc.) that are washed. In an embodiment wherein the wash process is implemented by a car wash, the number of washes relates to the number of vehicles that utilized the car wash, and thus is referred to as a "vehicle count." Indirect measurement sensors do not give a direct measurement of the level of chemical remaining, but rather an indirect measurement (e.g., rack count and vehicle count), which may be used to determine the level of chemical stored in the storage containers 312. Other forms of indirect measurement may relate to the length in time that a cleaning system has been operational or performing a particular process, e.g., rinsing, over a given period in time. The indirect measurement sensors in this embodiment may include active integrated circuits and memory for generating and storing the indirect measurement. Each time a wash is started the indirect measurement sensors increase a wash count value. The wash count value are stored in the data store 324. Subsequently, the wash count value(s) may be transmitted to the central management facility 310 via the communication device 326. As is discussed below, the central management facility 310 analyzes the indirect measurement, such as wash count, and determines an estimated time of exhaustion related to the chemical level.

In addition to monitoring devices, the remote facilities also may be equipped with one or more process control devices. In an embodiment of the present invention, a control device may be a control valve 320 through which each storage container 312 is connected to the wash system 322. For example, the control valve 320 controls the amount of chemical product dispensed from the storage container 312 that is used during a wash cycle. Control valves 320 can take many different forms depending on the chemical product and use including metering pumps and motorized valves for liquid applications, and volumetric and gravimetric feeders for solid chemical dispensing. In the illustrated embodiment, each control valve 320 is connected to the controller 318 to receive control commands therefrom and communicate data regarding the performance of the valve to the controller 318, if necessary. The controller 318 receives process data from monitoring devices at the remote chemical usage facility 302 and issues commands to control devices. An exemplary controller 318 is shown in FIG. 1 and described above in the corresponding text.

As illustrated, the controller 318 is connected to a data store 324 in the embodiment shown, which allows the controller 318 to access and store process data as necessary. The controller 318, depending on the embodiment, may operate in several different ways. For example, the controller 318 may not be required to process any raw data but rather to simply transmit the raw data to the central management facility 310 over the communications network 308. In other embodiments, the controller 318 may analyze the raw data and transmit the analytical results derived from the raw data to the central management facility 310 including any alarms indicators (such as "low chemical alarm" or "malfunction alarm") or condition indicators (such as "all systems functioning properly" or "currently using chemical X"). The controller 318 may continuously or periodically transmit data, as appropriate. Optionally, the controller 318 may be designed to transmit specific data in response to a query from an operator or some preset condition, such as the chemical level falling below a set point.

The controller 318 may continuously or periodically transmit and receive data to/from the central management facility 310, as appropriate. Furthermore, the controller 318 may transmit data and notifications to one or more recipients, such as jobbers and chemical suppliers, in addition to the central management facility 310. Indeed, in accordance with one embodiment, the controller 318 serves as a thin client that transmits and receives data to the central management facility 310 during regularly scheduled time intervals. For example, the controller 318 may transmit collected data to the central management facility 310 hourly, daily, weekly, or even after each individual wash cycle for a vehicle. Optionally, the controller 318 may be designed to transmit specific data in response to a query from an operator, in response to a query issued by the central management facility 310, or in response to some preset condition, such as the chemical level falling below a predetermined level.

In another embodiment, the controller 318 may also control operation of any of the processes performed at the facility. For example, the controller 318 may automatically, or in response to a command, switch between storage containers 312 to change the types of chemical product used in the wash system 322 depending on data received from the level sensors 316, or alternatively, the indirect measurement sensors. The controller 318 may also increase the wash time for loads that have a particularly high soil level or change the type of detergents used based on the type of soil detected in the load. Automatic control of the processes by the controller 318 may be adjusted in response to external data provided periodically by the operator (e.g., types of loads that may effect soil composition, etc.) or may be designed into the controller 318 by the manufacturer or installer.

The controller 318 is coupled to a communication device 326 in the exemplary embodiment. The purpose of the communication device 326 is to interface between the controller 318 and the communications network 308 and support the transfer of data therebetween. In the exemplary embodiment shown, the communication device 326 is a modem connected to a terrestrial telephone line, although, as discussed above, any means for communicatively coupling the controller 318 to the communications network 308 is contemplated.

For the purposes of further illustration, several additional monitoring devices have been shown in the exemplary embodiment. An effluent monitoring device 328 is illustrated. This effluent monitoring device 328 monitors the amount and/or composition of chemicals and soil in the effluent coming from the cleaning system 322 before the effluent is discharged. The effluent monitoring device 328 can collect process data on the amount and type of soil present on the items being washed in the chemical usage facility 302 and the amount and type of excess detergent or other chemical present in the effluent.

The soil monitoring device 330 collects data related to the composition and amount of soil or residue that may be located on items, e.g., vehicles, wares, laundry, etc., being washed by the wash system 322. Based on information received by the soil monitoring device 330, the soil monitoring device 330 may be used to determine such things as the appropriate chemical product, wash pressure, and wash time for each item to be applied to an item that is washed by the wash system 322. In one embodiment, a customer can wipe a soil sample from the item and deposit the sample in the soil monitoring device 330, which determines the composition of the soil. With this information, the controller 318 can select the appropriate chemical product and other wash characteristics to best clean the item. In another embodiment, the soil monitoring device 330 includes an input means for users to enter information related to the composition of the soil believed to be located on the item. In this embodiment, this input means may receive such information local to the soil monitoring device 330, or alternatively, over a remote connection to the central management facility 310. As such, operators may issue instructions related to soil composition over a remote network connection. Data received by the soil monitoring device 330 is communicated to the controller 318, which analyzes the data and adjusts various wash processes based on said analysis. For example, a particularly oily sample may result in automatic selection of a cleaning agent having a relatively high surfactant concentration.

Data collected by the soil monitoring device 330 may also be stored for later use in the data store 324 or transmitted to the central management facility 310 or both. If transmitted to the central management facility 310, the central management facility 310 may actually utilize data collected by the soil monitoring device 330 to manage processes at the chemical usage facility 302 through the controller 318. In this sense, the central management facility 310 issues commands to the controller 318 related to control over one or more processes at the chemical usage facility 302, such as, without limitation selecting the appropriate detergent and other wash characteristics to best clean an item or items.

Figure 4:
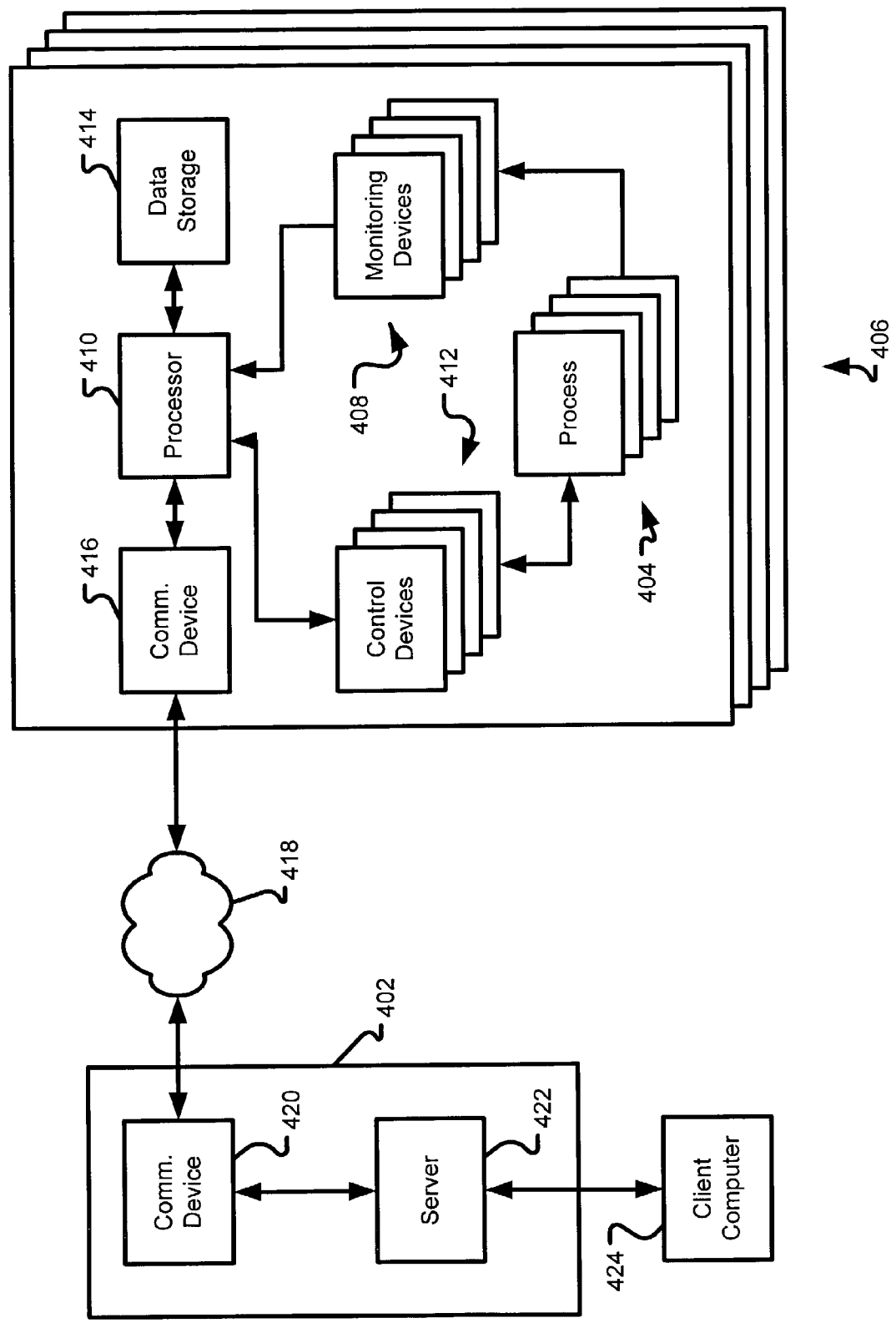
FIG. 4 illustrates a generalized embodiment of the present invention utilized by a central management facility to monitor and control chemical processes at one of a plurality of remote chemical usage facilities.

FIG. 4 illustrates a generalized embodiment of the present invention utilized by a central management facility 402 to monitor and control chemical processes 404 at one of a plurality of remote chemical process facilities 406, which may include one or more chemical process monitoring devices 408 that are communicatively coupled to a controller 410. A chemical process monitoring device 408 may take many form depending upon the type of process it is designed to monitor, the data it reports, and the function complexity required by the user. Examples of simple monitoring devices include thermistors, pre-calibrated temperature-sensitive resistors, and pressure sensors. More complex monitoring devices may include one or more data sensing devices, a controller, data storage, and a dedicated power source.

Also, a chemical process facility 406 may include chemical process control devices 412. Examples of such devices 412 include process equipment such as heaters, pumps, control valves, sprayers, scrubbers and the like. Through the control devices 412, an operator can control the operation of the processes at the remote chemical process facility 406, thereby allowing the operator to change process settings in response to changing conditions at the facility. The control devices are communicatively coupled to the controller 410 from which they receive commands from the operator or commands generated by the controller 410 itself. Many control devices 412 may also perform monitoring functions. Furthermore, although the control devices 412 and monitoring devices 408 have heretofore been discussed separately, such devices may be combined into a single device within the scope of the invention.

The controller 410, in addition to being communicatively coupled to the monitoring devices 408 and control devices 412, is communicatively coupled to a data store 414, capable of storing process data and environmental parameters, and a communications device 416. Process data may be transmitted by the controller 410 through a communications device 416, which is communicatively coupled to the central measurement facility 402 through a communications network 418. In the embodiment, the central management facility 402 is also provided with a communication device 420, which can receive the process data transmitted from the remote facilities 406 and pass the process data on to a server 422. The server 422 may store the data and may analyze the data to determine if any action is required. Based on the results of the analysis, the server 422 may send a notification to the client computer 424 or may send a command or notification to the chemical usage facility 406. For example, the server 422 may receive an alarm indicating low chemical levels at a specified facility. In response to the alarm, the server 422 may send a signal to a client computer 424, such as an email to the jobber or a page to the jobber's cell phone. In accordance with various embodiments, the client computer 424 may be a tablet pc, a desktop computer, a pager, a personal digital assistant, a cellular telephone, etc.

Various other embodiments of the means of communicating between the remote chemical process facilities 406 and client computer 424 are contemplated as embodiments of the present invention. For example, the communication device 420 and server 422 need not be physically located at the central management facility 402. In an embodiment, the server 422 may be located at some third party "server farm" that is accessible by any client computer 424 that has access to the Internet. In another embodiment, one or more of the remote facilities 406 may be equipped with a server 422, wherein each facility with a server is provided with its own internet access and can be queried by any client computer 424 connected with the communications network.

Figure 5:
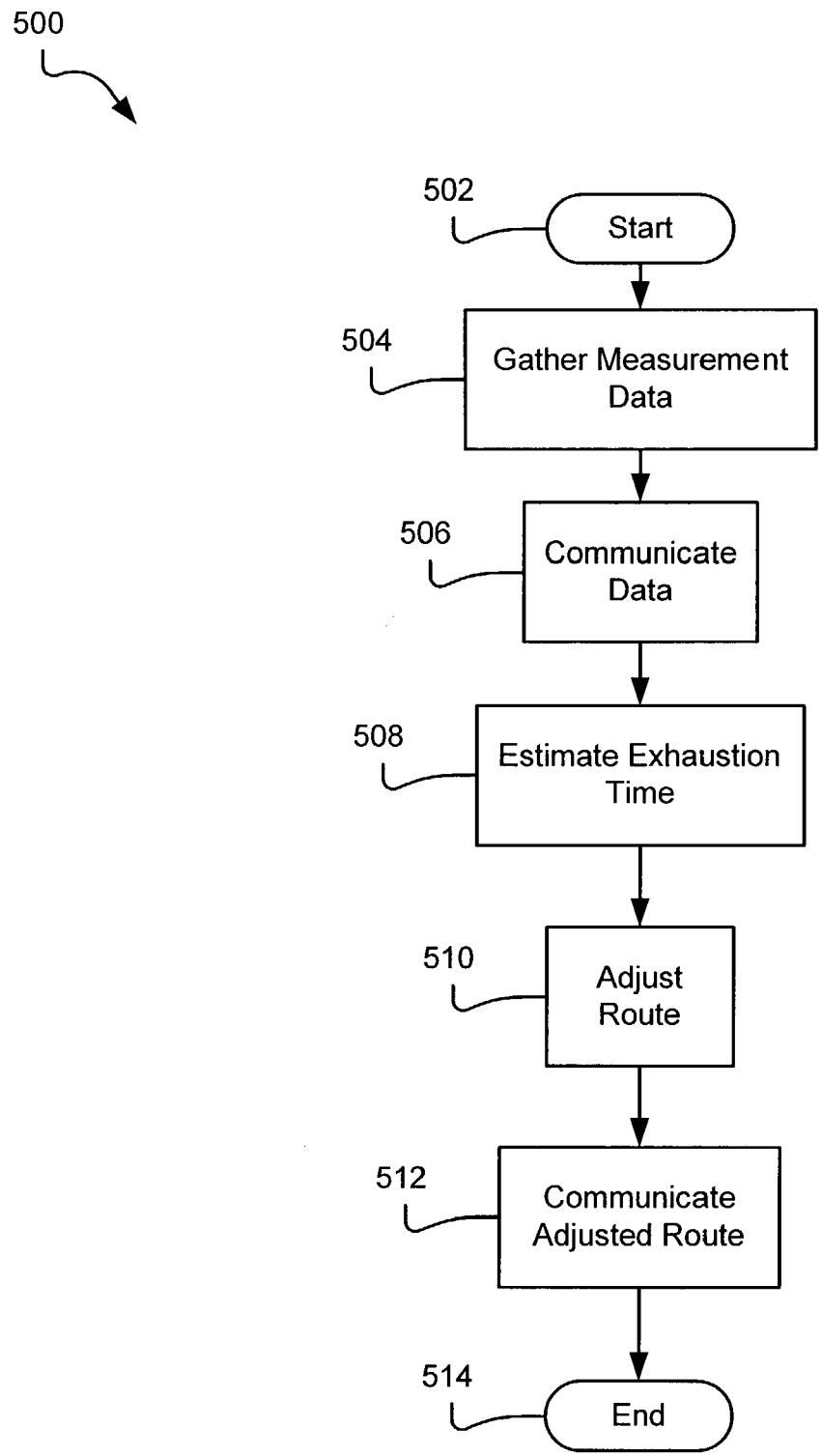
FIG. 5 is a flow diagram that illustrates operational characteristics for scheduling delivery of chemicals to a chemical usage facility in accordance with an embodiment of the present invention.

FIG. 5 illustrates operational characteristics of a process 500 for scheduling delivery of chemical products to chemical usage facilities in accordance with an embodiment of the present invention. In one embodiment, operations of the route scheduling process 500 are executed by one or more computer systems (e.g., computer system 100) at one or more remote chemical usage facilities (e.g., 302, 304, 306) and/or the central management facility (e.g., 310). As such, the one or more remote chemical usage facilities each utilize a controller (e.g., 318) and the central management facility utilizes a server computer (e.g., 422) to execute the operations of the route scheduling process 500. In an embodiment, the controller of each chemical usage facility may serve as a client to the server computer at the central management facility.

The route scheduling process 500 is described below as a process of scheduling delivery of a single chemical product to a single chemical usage facility in accordance with an exemplary embodiment. However, it should be appreciated that multiple instances of the route scheduling process 500 may be performed repetitively or simultaneously to schedule delivery of one or more chemical products to one or more chemical usage facilities. Furthermore, although described herein as monitoring chemical product usage at a chemical usage facility, the route scheduling process 500 can similarly be used to monitor chemical product usage by a one or more chemical dispense systems at a particular chemical usage facility.

As discussed above with reference to FIG. 3, a central management facility (e.g., central management facility 310) may dispatch a service vehicle (e.g., service vehicle 350), which provides chemical products to the chemical usage facility (e.g., chemical usage facility 302). The chemical products may be in solid or liquid form. In an embodiment, the route scheduling process 500 is performed such that the service vehicle is dispatched before the chemical product is exhausted at the chemical usage facility, so that there is no down-time.

The route scheduling process 500 is performed using a flow of operations ("operation flow") beginning with a start operation 502 and concluding with a terminate operation 514. The start operation 502 is initiated as the chemical product is first dispensed in a chemical process at the chemical usage facility. From the start operation 502, the operation flow passes to a gather operation 504. In one embodiment, the gather operation 504 gathers measurement data that directly represents the amount (e.g., volume or weight) of chemical product used at the chemical usage facility. In another embodiment, the gather operation 504 gathers measurement data that indirectly represents the amount (e.g., volume or weight) of chemical product used at the chemical usage facility. In an embodiment wherein the chemical product is used by a ware washer, the gather operation 504 counts the number of wash-cycles. The gather operation 504 may generate a rack count related to the number of wash-cycles. In each wash-cycle, a predetermined number of racks may be washed. Using this predetermined rack count per wash, the gather operation 504 can determine a rack count for the chemical usage facility, or alternatively, a particular machine at the chemical usage facility. The measurement data preferably includes a chemical usage facility identifier (ID) and/or machine ID, which associates the measurement data with a particular facility and/or machine. From the gather operation 504, the operation flow passes to a communicate operation 506 in an embodiment of the present invention.

The communicate operation 506 transmits, or communicates, the measurement data gathered by the gather operation 504 to a central management facility, or more specifically, a server computer at the central management facility, that processes the measurement data. The communicate operation 506 may transfer the measurement data on a substantially periodic basis, in response to a request from the server computer, as the measurement data is obtained, or on any other time basis as is suitable to the particular implementation. The communicate operation 506 preferably organizes the measurement data in a format that is readily recognizable by the server computer. In response to the transmission by the communicate operation 506, the server computer receives, and decodes, formats, and stores the measurement data as may be necessary in the particular implementation. From the communicate operation 506, the operation flow passes to an estimate operation 508.

Figure 6:
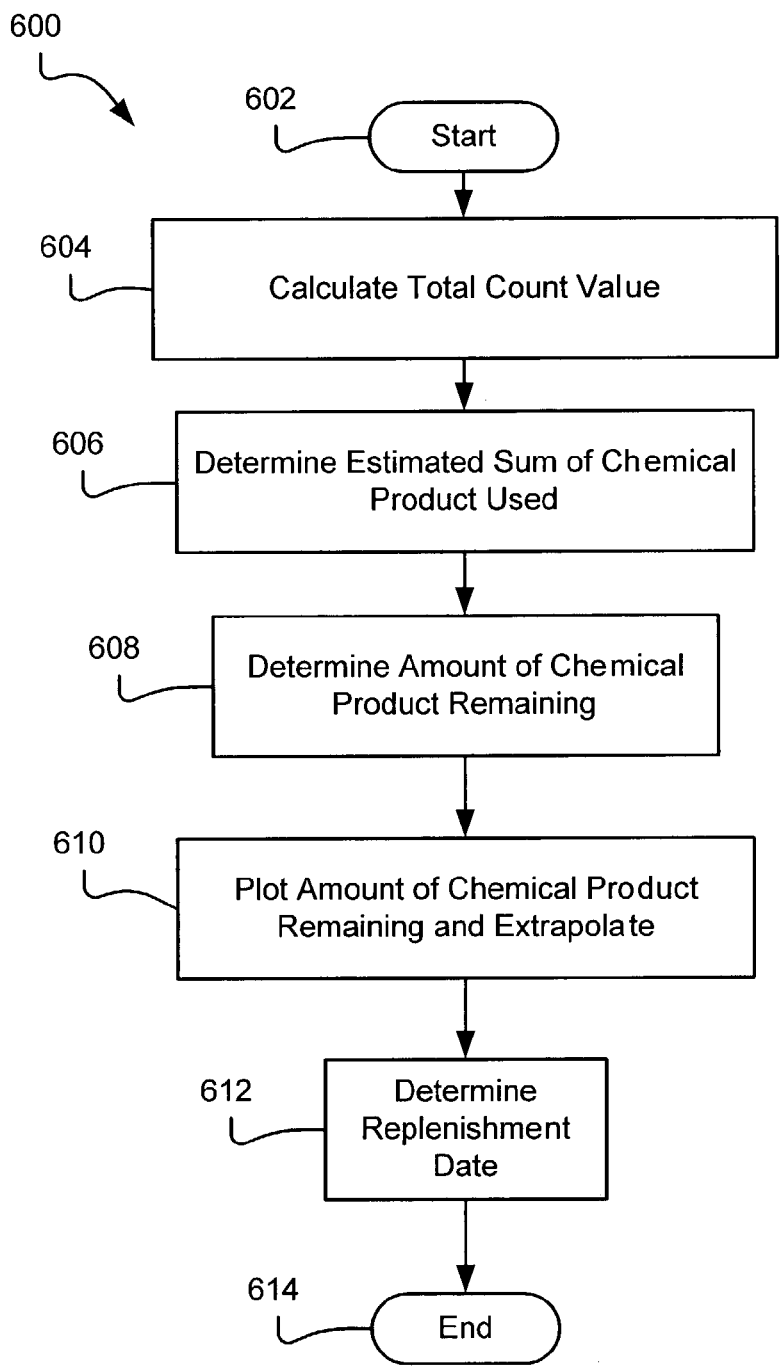
FIG. 6 is a flow diagram that illustrates operational characteristics of a process for estimating a point in time when a chemical is to be depleted from the chemical usage facility described in FIG. 5 in accordance with an embodiment of the present invention.

The estimate operation 508 manipulates the measurement data to render an estimate or prediction representing a point in time when the chemical product will be substantially exhausted or depleted. The estimate operation 508 employs one or more algorithms that may be known in the art, such as calculating a monthly running average, a Monte Carlo prediction method, or linear extrapolation. Other prediction algorithms are known in the art and may be effectively implemented by the estimate operation 508. One such embodiment is depicted in FIG. 6, described below. In an embodiment, the estimate operation 508 generates a time, for example in units of days, when the chemical product will be substantially depleted. For example, the estimate operation 508 may yield a count in days until the chemical product is 90% depleted. From the estimate operation 508, the operation flow passes to an adjust operation 510.

The adjust operation 510 updates a delivery route for the service vehicle such that the service vehicle is directed to replenish the chemical product at the chemical usage facility prior to or substantially close to the point in time predicted by the estimate operation 508. In an embodiment, the delivery route is represented by a list of addresses of each of the chemical usage facilities the service vehicle is to physically visit to deliver at least one chemical product. In this embodiment, the adjust operation 510 may add the delivery address of the chemical usage facility to the delivery route.

In yet another embodiment, the adjust operation 510 adjusts the delivery route such that the chemical product is delivered to the chemical usage facility prior to the point in time or substantially close to the point in time predicted by the estimate operation 508, while also meeting one or more predetermined benchmarks, such as, without limitation, fastest delivery speed or shortest delivery route. To accomplish this, the address of each chemical usage facility that the service vehicle is to visit may be analyzed to determine shortest distance between physical locations. This analysis also takes into account the point in time predicted by the estimate operation 508 such that the primary goal of replenishment prior to exhaustion is maintained.

In addition to addresses of chemical usage facilities on the delivery route, the adjust operation 510 may use other information to meet the benchmarks. Other types of useful information include, but are not limited to, weather conditions, traffic delays, road conditions, or map information (e.g., location names, street names and addresses, etc.). The other types of information may be provided by one or more websites or online databases that compile such information. Alternatively, the other types of information may be transmitted via wireless communication, such as a Global Positioning System (GPS), which may provide "up-to-the-minute" conditions.

In a particular embodiment of the adjust operation 510, the delivery route is adjusted to minimize driving distance. In this particular embodiment, a new delivery address is added to the delivery route primarily based on where the new address is relative to other delivery addresses in the delivery route. The adjust operation 510 identifies available streets that lead to the new delivery address, determines which street(s) could be used in the delivery route, and inserts the new delivery address into the delivery route at a position that minimizes the distance traveled in the entire route. In this embodiment, map information may provide the available streets, and road condition information may be used to eliminate streets that include construction projects.

The estimate operation 508 and the adjust operation 510 may be repeated any number of times depending on the number of chemical usage facilities and/or chemical dispense systems analyzed. The estimate operation 508 and adjust operation 510 are preferably carried out by a server computer at a central management facility (e.g., central management facility 310). In one embodiment, the central management facility server has the latest version of a delivery route (e.g., stored in memory), updates the latest version of the delivery route based on the estimated exhaustion time(s), and prepares the updated version of the delivery system for transfer to a delivery truck (e.g., delivery truck 350). From the adjust operation 510, the operation flow passes to a second communicate operation 512.

The second communicate operation 512 transfers updated delivery route information to a delivery truck, which is preferably outfitted with computerized mobile route management system. The delivery truck includes a wireless receiver, whereby the computerized mobile route management system receives updated delivery route information from the central management facility. In one embodiment, the delivery truck includes a BlueTooth® enabled communication system in operable communication with a computerized device, such as a Personal Digital Assistant® (PDA). Via BlueTooth®, the updated delivery route information is transferred from the central management facility to the PDA, which includes software to manage the updated delivery route information. Other wireless communication systems and mobile data management devices and software are known in the art and may be readily used in other embodiments that are within the scope of the present invention.

The updated delivery route information may be in any format suitable to the particular implementation. In one particular embodiment, the delivery route information is binary encoded data that represents street addresses listed in order of delivery. The central management facility transfers the delivery route information by encoding and formatting the information as necessary, modulating a carrier signal with the delivery information, and transmitting the modulated signal using one or more selected communication channels. The transmitted information includes a delivery truck ID, by which the appropriate delivery truck receives the transmitted information. The information may include the entire updated route, or only portions of the updated route with insertion point information, or any other variation that may optimize a selected specification (e.g., bandwidth, memory, transmission time, etc.). The route information may include types of chemical product to be delivered. The route information, including chemical product types, facility IDs, and addresses are displayed to delivery personnel in the delivery vehicle. Following the second communicate operation 512, the route scheduling process 500 concludes at the terminate operation 514.

FIG. 6 illustrates operational characteristics of a process 600 for estimating chemical product depletion by a chemical usage facility using indirect measurement data in accordance with an embodiment of the present invention. As such, the estimation process 600 illustrates the estimate operation 508 (FIG. 5) in more detail in accordance with an embodiment of the present invention. The estimation process 600 is described below as estimating a depletion date of a single chemical product used by a process at a single chemical usage facility. However, it should be appreciated that any number of instances of the estimation process 600 may be performed in repetitive or simultaneous fashion to determine depletion dates for a plurality of chemical products at one or more chemical usage facilities.

The estimation process 600 is performed by a flow of operations ("operation flow") beginning with a start operation 602 and concluding with a terminate operation 614. The start operation 602 is initiated following the communicate operation 508 (FIG. 5). After the start operation 602, the operation flow passes to a calculate operation 604. The calculate operation 604 adds indirect measurements gathered by the gather operation 504 to yield a total count value indirectly representing the amount of the chemical product used over a specified period in time (e.g., days, weeks, months or years). For example, the calculate operation 604 adds the measurement data to yield a daily, weekly or monthly total count value, which is indirectly related to the amount of chemical product used on a daily, weekly or monthly basis.

In an exemplary embodiment, the measurement data relates to a rack count (e.g., rack count from a ware washer), and thus, the total count value represents the total number of racks that have been washed by the warewasher during the specified period in time. In this embodiment, the calculate operation 604, when performed multiple times during multiple estimation processes 600, calculates a total rack count value for each of the past 'n' days, weeks or months, where 'n' is a number of days, weeks or months from which the chemical product had last been replenished at the chemical usage facility. In another exemplary embodiment, the measurement data may relate to a vehicle count representative of the number of vehicles washed at a vehicle wash facility. As such, the calculated total count value represents the total number of vehicles that have been washed at the vehicle wash facility over the specified period in time. From the calculate operation 604, the operation flow passes to a multiply operation 606.

Illustrating the estimate process 600 using an embodiment wherein the chemical product depletion date for a chemical product used by a ware washer is estimated, the multiply operation 606 multiplies the total count value determined by the calculate operation 604 by a predetermined dissolution rate associated with the type of chemical product and process in which the product is used. The multiply operation 606 yields the amount of chemical product dissolved during the specified period in time. In an embodiment, the dissolution rate for each chemical product is a conversion constant in terms of chemical quantity divided by count value. For example, with reference to a warewash chemical product in solid block form, the dissolution rate may be approximately 2 ounces/rack counted. As such, if the total count value for a specified period in time equals 100 racks, then the amount of this chemical product dissolved during the specified period in time is 200 ounces. From the multiply operation 606, the operation flow passes to a subtract operation 608.

The subtract operation 608 subtracts amount of chemical product dissolved during the specified period in time from a relative original quantity of the chemical product. The relative original quantity is initially the original amount of chemical product delivered to the chemical usage facility prior to first use. The relative original quantity thereafter is reduced based on the quantity of chemical product used during each specified period in time to reflect the amount of chemical product remaining after each of the specified periods in time. The subtraction operation 608 therefore yields an estimate representative of the amount of chemical product remaining after the specified period in time. From the subtraction operation 608, the operation flow passes to an extrapolate operation 610.

After more than one iteration of the estimation process 600, the estimates of remaining chemical product are analyzed by the extrapolate operation 610 to identify a trend in chemical product depletion. In one embodiment, the extrapolate operation 610 fits the chemical product estimates to a time line. In this embodiment, an exhaustion point and a threshold depletion point are identified after the time line is fitted to the estimate points. The exhaustion point is the point on the fitted time line representing a time when the chemical product is considered 100% depleted. The threshold depletion point is any point on the fitted time line that a delivery should be scheduled. For example, at the point on the time line where the chemical product is 90% depleted, the chemical delivery service may schedule delivery. Any threshold depletion point may be set by the delivery service. From the extrapolate operation 610, the operation flow passes to a determine operation 612. The determine operation 612 analyzes the time line to determine the date corresponding to an estimated point in time where the threshold depletion point will be met. From the determine operation 612, the operation flow concludes at the terminate operation 614.

Figure 7:
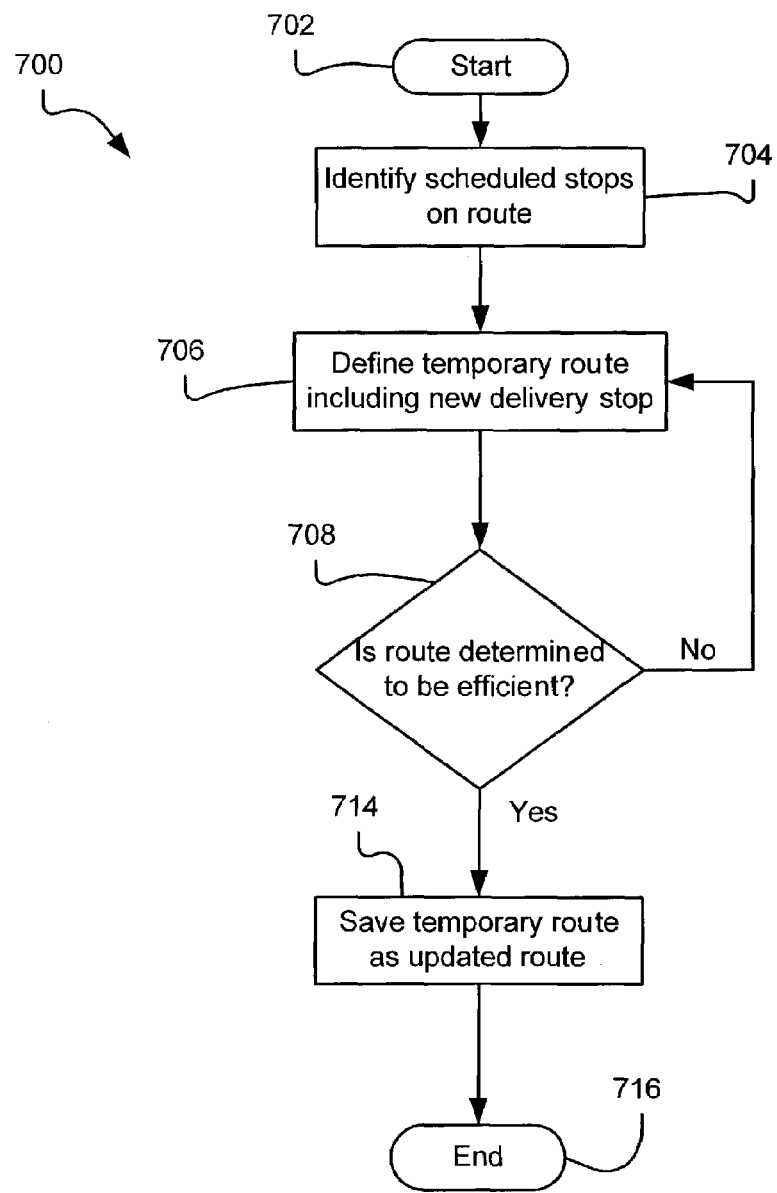
FIG. 7 is a flow diagram that illustrates operational characteristics for updating a delivery route to include the chemical usage facility described in FIG. 5 based on the point in time estimated by the process of FIG. 6 in accordance with an embodiment of the present invention.

FIG. 7 is a route updating procedure 700 showing exemplary operations that may be employed to carry out the adjust operation 510 (FIG. 5). The route updating procedure 700 is performed using an operation flow beginning with a start operation 702 and concluding with a terminate operation 716. The start operation 702 is initiated as the operation flow of the route scheduling process 500 passes from the estimate operation 508 to the adjust operation 510, wherein the route updating procedure 700 is administered. From the start operation 702, the operation flow passes to an identify operation 704. The identify operation 704 identifies scheduled stops on a delivery route for a specified period in time, e.g., half-day, day, multiple days, week, etc. The stops represent chemical usage facilities that the service vehicle is scheduled to visit to replenish chemical products at the facilities. From the identify operation 704, the operation flow passes to a define operation 706.

The define operation 706 adds to the delivery route a stop for the chemical usage facility being scheduled by the route scheduling process 500. In an embodiment, the define operation 706 defines a temporary route during the specified time, wherein the temporary route includes the stop for this chemical usage facility. From the define operation 706, the operation flow passes to an apply operation 708. The apply operation 708 applies a route minimization algorithm to the temporary route. The route minimization algorithm analyzes the temporary route against one or more predefined factors to determine whether the temporary route is an efficient route respective to other potential routes that include the scheduled stops and the stop for the chemical usage facility being scheduled by the route scheduling process 500. Such factors may include, without limitation, fuel consumption, minimum distance, overhead cost and time. Route minimization algorithms, which are based on various theories of linear programming, are well known in the art, and therefore not described in detail herein. As such, it should be appreciated that the apply operation 708 may utilize any type of route minimization algorithm that analyzes the temporary route against any predefined factor related to efficiency of chemical product delivery.

If the apply operation 708 determines that the temporary route is an efficient route, the operation flow passes to a save operation 714. The save operation 714 saves the temporary route as the delivery route for the service vehicle over the specified period in time. From the save operation 714, the operation flow of the route updating procedure 700 passes to the terminate operation 716. At the terminate operation 716, the operation flow of the route scheduling process 500 resumes at the second communicate operation 512. If, however, the apply operation 708 determines that the temporary route is an inefficient route, the operation flow passes back to the define operation 706, where another temporary route is defined and the operation flow continues as described in the preceding paragraphs.

Figure 8:
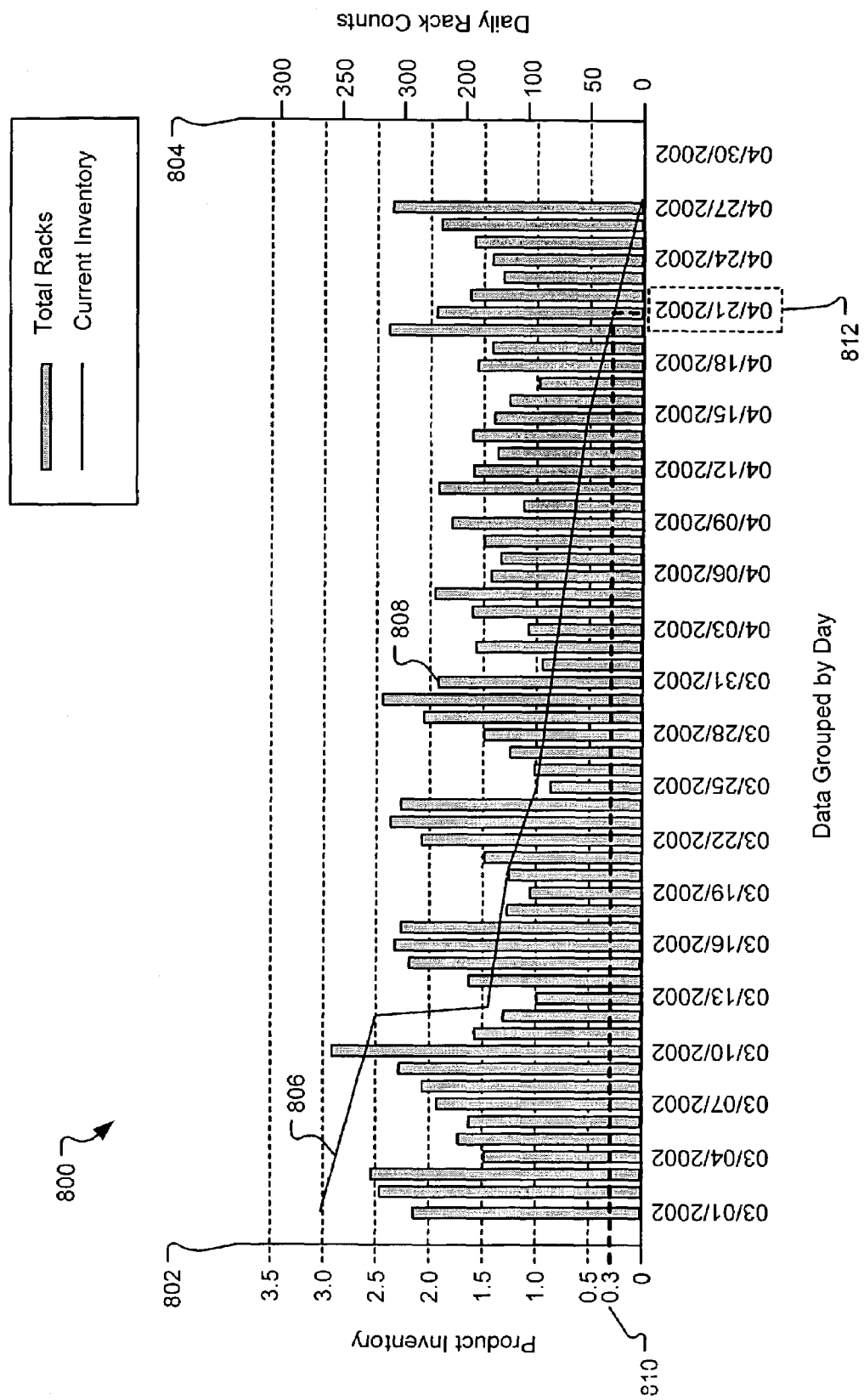
FIG. 8 is a graph depicting ware washer rack count along with predicted chemical inventory over time that may be used in conjunction with an embodiment to predict chemical exhaustion.

FIG. 8 is a graph 800 depicting estimation of a depletion date for a chemical product used at a chemical usage facility. As such, the graph 800 illustrates operations performed by the estimation process 600 in accordance with an embodiment of the present invention. For illustrative purposes, and not by means of limitation, the chemical product charted in the graph 800 is used by a ware washer to wash items carried into the washer on racks. As such, the measurements gathered by the gather operation 504 for use by the estimation process 600 represent a rack count indicative of the number of racks that enter the ware washer on a daily basis. The predicted chemical product inventory along with the rack count for the ware washer are plotted over time in the graph 800. The graph 800 may be output, e.g., displayed or printed, to users by the route scheduling system in order to assist users in understanding trends in chemical product usage. The graph 800 is presented herein to assist the reader in understanding how trends in chemical product usage may be analyzed to schedule delivery stops on a route.

As shown in FIG. 8, product inventory levels are on the left axis 802 and daily rack counts are on the right axis 804. A current inventory line 806 depicts a trend in chemical product usage on a daily basis. Daily rack counts are shown with bars 808 on a daily basis. As might be expected, as racks are washed, the chemical product trends go down, as shown by the current inventory line 806. The current inventory line 806 trends ultimately to zero. Preferably, the chemical product inventory at the associated chemical usage facility or machine is replenished prior to total depletion. As discussed above, prior to total depletion, a service center dispatches a delivery vehicle by updating a route schedule to include the associated chemical dispense system or facility.

A threshold depletion point 810 is illustrated at a product inventory of 0.3. In this particular embodiment, the threshold depletion point 810 is equal to 90% of the initial 3.0 product inventory. The threshold depletion point 810 may be set equal to other proportions of the initial product quantity in other embodiments. A threshold depletion day 812 associated with the threshold depletion point 810 is identified in order to schedule the associated facility or machine on a delivery route. As shown in the particular embodiment, the threshold depletion day 812 is Apr. 21, 2002. In one embodiment, prior to the actual delivery date, the threshold depletion day 812 may change in the delivery route schedule. This would occur as the trend line changes in response to changes in product measurements.

It will be clear that the present invention is well adapted to attain the ends and advantages mentioned, as well as those inherent therein. While a presently preferred embodiment has been described for purposes of this disclosure, various changes and modifications may be made which are well within the scope of the present invention. For example, the above specification, examples and data provide an exemplary description of the manufacture and use of the present invention. Embodiments of the present invention, however, may be applied in areas other than laundry, ware wash and vehicle wash operations. For example, in an agriculture applications, a herbicide dispenser may be supply herbicide to a chemical application system, such as an irrigation system or a herbicide sprayer on a crop duster or tractor. The herbicide dispenser data (e.g., timing, amount, and identity of herbicide being dispensed) may be combined with corporate data (e.g., chemical costs, labor costs, field production results, weather conditions, soil conditions, and type of plants) to manage chemical usage. Furthermore, sanitation systems in the food and beverage industries and water treatment industries are also contemplated within the scope of the present invention.

In accordance with another embodiment, an earlier than expected point of exhaustion that is predicted for a particular chemical product may be used as an indication that a cleaning system is malfunctioning. In yet another embodiment, an audit process may be implemented in conjunction with the estimation process 600. An audit process in this embodiment includes a service technician comparing the actual amount of chemical product remaining during a physical service visit to a relative amount of chemical product that of chemical product remaining at the time of the visit. The relative amount of chemical product remaining may be based on either direct or indirect measurements taken at the chemical usage facility being audited. Results of the comparison performed by the audit process may be used to calculate a relative set point that may be applied to an estimated time of depletion to render a more accurate estimation.

As many embodiments of the invention can be made without departing from the spirit and scope of the invention, the invention resides in the claims hereinafter appended.

What is claimed is:

1. A method for routing delivery of chemical products to chemical usage facilities, the method comprising:
  determining usage of a first chemical product dispensed at a first chemical usage facility having a client computer for obtaining measurement data corresponding to a dispensed quantity of the first chemical product during a plurality of specified periods in time, wherein determining usage comprises:
    calculating usage of the first chemical product during each of the specified periods in time using a plurality of indirect measurements collected at the first chemical usage facility by the client computer during the specified periods in time, wherein the indirect measurements relate to a count of wash cycles; and
    adding each of the plurality of indirect measurements to yield a plurality of total count values indirectly representing usage of the first chemical product during each of the specified periods in time;
  predicting an estimated time of exhaustion of the first chemical product based on usage determined for each of the plurality of specified periods in time, wherein predicting an estimated time of exhaustion further comprises:
    plotting an estimate of remaining the first chemical product following each of the specified periods in time on a time line; and
    extrapolating the plotted estimates on the time line to estimate the time of exhaustion of the first chemical product;
  transmitting usage of the first chemical product at the first chemical usage facility during each of the plurality of specified periods in time to a central management facility that includes a server computer; and
  scheduling, using the server computer, delivery of the first chemical product to the first chemical usage facility based on a predetermined time for replenishment respective to the predicted estimated time of exhaustion of the first chemical product, wherein scheduling delivery further comprises:

identifying one or more other chemical usage facilities on a predefined route represented as a list of delivery locations for delivery of chemical products;

determining a sequential position on the list of delivery locations in which to insert a delivery location for the first chemical usage facility based on the predetermined time for replenishment of the first chemical product;

adjusting the predefined route by inserting the delivery location for the first chemical usage facility into the determined sequential position on the list; and delivering the chemical product to the chemical usage facility according to the adjusted predefined route.

2. A method as defined in claim 1, further comprising:

determining usage of a second chemical product at a second chemical usage facility during the plurality of specified periods in time;

predicting an estimated time of exhaustion of the second chemical product based on usage determined for the plurality of specified periods in time; and scheduling delivery of the second chemical product to the second chemical usage facility based on the predetermined time for replenishment respective to the estimated time of exhaustion of the second chemical product.

3. A method as defined in claim 2, wherein the scheduling act comprises:

generating a route schedule for delivering the first chemical product to the first chemical usage facility and the second chemical product to the second chemical usage facility based on a comparison between the predetermined time for replenishment of the first chemical product and the predetermined time for replenishment of the second chemical product.

4. A method as defined in claim 3, wherein generating a route schedule comprises:

adjusting the route schedule based on a comparison between a location of the first chemical usage facility and a location of the second chemical product.

5. A method as defined in claim 1, wherein determining usage comprises:

calculating a quantity of the first chemical product used during each of the specified periods in time by measuring an amount of first chemical product dispensed at the first chemical usage facility during the specified periods in time.

6. A method as defined in claim 5, wherein the specified periods in time comprise an initial time period and at least one subsequent time period, and wherein predicting an estimated time of exhaustion comprises:

subtracting the quantity of the first chemical product dispensed during the initial time period from en original quantity of the chemical product to render an estimate of remaining chemical product following the initial time period, wherein the estimate of remaining chemical product then represents a relative original quantity for use in estimating remaining chemical product after each of the subsequent time periods; and subtracting the quantity of the first chemical product dispensed during each of the subsequent time periods from the relative original quantity to yield estimates of remaining chemical product following each of the subsequent time periods, wherein the relative original quantity being set to the estimate of remaining chemical product after each subtracting act performed for each subsequent time period.

7. A method as defined in claim 6, wherein predicting an estimated time of exhaustion further comprises:

plotting the estimate of remaining chemical product following the initial time period and the estimates of remaining chemical product after each of the subsequent time periods on a time line; and extrapolating the plotted estimates on the time line to estimate the time of exhaustion.

8. A method as defined in claim 5, wherein determining usage of a first chemical product comprises determining usage of a first chemical product tat is in liquid form.

9. A method as defined in claim 5, wherein determining usage of a first chemical product comprises determining usage of a first chemical product that is in solid form.

10. A method as defined in claim 1, wherein each of the plurality of indirect measurements that relate to a count of wash cycles comprises an instance that a rack is washed by a ware wash machine.

11. A method as defined in claim 1, wherein each of the plurality of indirect measurements that relate to a count of wash cycles comprises an instance that a vehicle is washed by a vehicle wash facility.

12. A method as defined in claim 1, wherein determining usage further comprises:

multiplying each of the plurality of total count values by a dissolution rate associated with the first chemical product to render a quantity of the first chemical product used at the first chemical usage facility during each of the plurality of specified periods in time.

13. A method as defined in claim 12, wherein specified periods in time comprise an initial time period and at least one subsequent time period, and wherein predicting an estimated time of exhaustion comprises:

subtracting the quantity of the first chemical product used during the initial time period from an original quantity of the chemical product to render an estimate of remaining chemical product following the initial time period, wherein the estimate of remaining chemical product then represents a relative original quantity for use in estimating remaining chemical product after each of the subsequent time periods; and subtracting the quantity of the first chemical product dispensed during each of the subsequent time periods from the relative original quantity to yield estimates of remaining chemical product after each of the subsequent time periods, wherein the relative original quantity being set to the estimate of remaining chemical product following each subtracting act performed for each subsequent time period.

14. A method as defined in claim 13, wherein predicting an estimated lime of exhaustion further comprises:

plotting the estimate of remaining chemical product following the initial time period and the estimates of remaining chemical product after each of the subsequent time periods on a time line; and extrapolating the plotted estimates on the time line to estimate the time of exhaustion.

15. A method as defined in claim 14, wherein determining usage of a first chemical product comprises determining usage of a first chemical product that is in solid form.

16. A method as defined in claim 1, wherein the determining a sequential position comprises:

analyzing a delivery parameter.

17. A method as defined in claim 16, wherein the delivery parameter relates to minimizing total route distance.

18. A method as defined in claim 16, wherein the delivery parameter relates to minimizing total route time.

19. A method as defined in claim 1 wherein determining a sequential position comprises:

analyzing one or more sets of traffic related data selected from the group consisting of map data, road condition data, road construction data, and weather data.

20. A method as defined in claim 1, wherein scheduling delivery comprises:
modifying a route schedule to include instructions to deliver the first chemical product to the first chemical usage facility.

21. A method as defined in claim 20, further comprising:
transmitting the route schedule to a service vehicle from the central management facility.

22. A system for routing delivery of chemical products to chemical usage facilities, the system comprising:
a chemical usage facility having one or more chemical dispense systems, each chemical dispense system dispensing a chemical product and having a monitor for obtaining measurement data corresponding to a dispensed quantity of the chemical product;
a central management facility in operable communication with the chemical usage facility, the central management facility having a server computer receiving transmissions of measurement data collected by a client computer at the chemical usage facility,
the central management facility server determining usage of a first chemical product at a first chemical usage facility during a plurality of specified periods in time, wherein determining usage comprises:
calculating usage of the first chemical product during each of the specified periods in time using a plurality of indirect measurements collected at the first chemical usage facility by the client computer during the specified periods in time, wherein the indirect measurements relate to a count of wash cycles; and
adding each of the plurality of indirect measurements to yield a plurality of total count values indirectly representing usage of the first chemical product during each of the specified periods in time;
predicting an estimated time of exhaustion of the first chemical product based on usage determined for each of the plurality of specified periods in time, wherein predicting an estimated time of exhaustion further comprises:
plotting an estimate of remaining first chemical product following each of the specified periods in time on a time line; and
extrapolating the plotted estimates on the time line to estimate the time of exhaustion of the first chemical product;
the central management facility server scheduling delivery of the first chemical product to the first chemical usage facility based on a predetermined time for replenishment respective to the predicted time of exhaustion of the first chemical product, wherein scheduling delivery further comprises:
identifying one or more other chemical usage facilities on a predefined route represented as a list of delivery locations for delivery of chemical products;
determining a sequential position on the list of delivery locations in which to insert a delivery location for the first chemical usage facility based on the predetermined time for replenishment of the first chemical product; and
adjusting the predefined route by inserting the delivery location for the first chemical usage facility into the determined sequential position on the list; and
a delivery vehicle communicatively connected to the central management facility, receiving the adjusted delivery schedule from the central management facility and delivering the chemical product to the chemical usage facility according to the adjusted delivery schedule.

23. A system as defined in claim 22, wherein each transmission of measurement data comprises:
a chemical usage facility identifier (ID) field comprising a chemical usage facility ID associated with the chemical usage facility;
a chemical dispense system ID field comprising a chemical dispense system ID associated with the chemical dispense system which monitored the measurement data; and
a measurement field comprising data collected by the client computer at the chemical usage facility, wherein the data contained in the measurement field is useable by the server computer to determine the time for replenishing the chemical product at the chemical usage facility.

24. A system as defined in claim 23, wherein the data placed into the measurement field of each transmission of measurement data by the client computer comprises a quantity of the chemical product dispensed during a specified period in time.

25. A system as defined in claim 24, wherein the client computer calculates the quantity of the chemical product dispensed during the specified period in time by measuring an amount of the chemical product dispensed at the chemical usage facility during the specified period in time.

26. A system as defined in claim 25, wherein the client computer transmits and the server computer receives a plurality of transmissions of measurement data, each transmission having a measurement field comprising data related to the quantity of the chemical product dispensed at the chemical usage facility during one of a plurality of specified periods in time.

27. A system as defined in claim 26, wherein responsive to receipt of the plurality of transmissions of measurement data, the server computer determines a quantity of remaining chemical product after each of the specified periods in time by subtracting the quantity of the chemical product dispensed during each of the specified periods in time from a relative original quantity initially set to an original quantity of the chemical product and subsequently set to the determined quantity of the chemical product following each of the specified periods in time.

28. A system as defined in claim 27, wherein the server computer plots the determined quantities of remaining chemical product after each of the specified periods in time on a time line and extrapolates the plotted quantities on the time line to an estimated time of exhaustion of the chemical product, wherein the time for replenishing occurs at a point on the time line prior to the estimated time of exhaustion.

29. A system as defined in claim 28, wherein the chemical product is in liquid form.

30. A system as defined in claim 28, wherein the chemical product is in solid form.

31. A system as defined in claim 22, wherein the server computer multiplies each of the plurality of total count values by a dissolution rate associated with the chemical product to render a quantity of the chemical product used at the chemical usage facility during each of the plurality of specified periods in time.

32. A system as defined in claim 31, wherein responsive to receipt of the plurality of transmissions of measurement data the server computer determines a quantity of remaining chemical product after each of the specified periods in time by subtracting the quantity of the chemical product used during each of the specified periods in time from a relative original quantity initially set to an original quantity of the chemical product and subsequently set to the determined quantity of the chemical product after each of the specified periods in time.

33. A system as defined in claim 32, wherein the server computer plots the determined quantities of remaining chemical product after each of the specified periods in time on a time line and extrapolates the plotted quantities on the time line to an estimated time of exhaustion of the chemical product, wherein the time for replenishing occurs at a point on the time line prior to the estimated time of exhaustion.

34. A system as defined in claim 22, wherein the server computer sets the adjusted delivery schedule such that delivery of chemical products on the delivery route is optimized respective to a delivery parameter.

35. A system as defined in claim 34, wherein the delivery parameter relates to minimizing total route distance.

36. A system as defined in claim 34, wherein the delivery parameter relates to minimizing total route time.

37. A system as defined in claim 34, further comprising:
a traffic information database in operable communication with the server computer, the traffic information database comprising traffic information selected from the group consisting of road condition data, traffic delay data, map data, and road construction data.

38. A system as defined in claim 37, wherein the server computer receives traffic information from the traffic information database and analyzes the traffic information to optimize delivery of chemical products along the delivery route.

39. A system as defined in claim 22, wherein the delivery vehicle comprises:
a route management device operable to store and display the adjusted delivery schedule; and
a communication module operable to receive the adjusted delivery schedule from the central management facility and communicate the adjusted delivery schedule to the route management device.

40. A tangible computer-readable storage medium comprising instructions, the instructions causing a processor to execute a computer process comprising:
determining usage of a first chemical product dispensed at a first chemical usage facility having a client computer for obtaining measurement data corresponding to a dispensed quantity of the first chemical product during a plurality of specified periods in time, wherein determining usage comprises:
calculating usage of the first chemical product during each of the specified periods in time using a plurality of indirect measurements collected at the first chemical usage facility by the client computer during the specified periods in time, wherein the indirect measurements relate to a count of wash cycles; and
adding each of the plurality of indirect measurements to yield a plurality of total count values indirectly representing usage of the first chemical product during each of the specified periods in time;
predicting an estimated time of exhaustion of the first chemical product based on usage determined for each of the plurality of specified periods in time, wherein predicting an estimated time of exhaustion further comprises:
plotting an estimate of remaining the first chemical product following each of the specified periods in time on a time line; and
extrapolating the plotted estimates on the time line to estimate the time of exhaustion of the first chemical product;
transmitting usage of the first chemical product at the first chemical usage facility during each of the plurality of specified periods in time to a central management facility that includes a server computer; and
scheduling, using the server computer, delivery of the first chemical product to the first chemical usage facility based on a predetermined time for replenishment respective to the predicted estimated time of exhaustion of the first chemical product, wherein scheduling delivery further comprises:
identifying one or more other chemical usage facilities on a predefined route represented as a list of delivery locations for delivery of chemical products;
determining a sequential position on the list of delivery locations in which to insert a delivery location for the first chemical usage facility based on the predetermined time for replenishment of the first chemical product;
adjusting the predefined route by inserting the delivery location for the first chemical usage facility into the determined sequential position on the list; and
delivering the chemical product to the chemical usage facility according to the adjusted predefined route.

41. The tangible computer-readable storage medium as defined in claim 40, wherein the computer process further comprises:
determining usage of a second chemical product at a second chemical usage facility during the plurality of specified periods in time;
predicting an estimated time of exhaustion of the second chemical product based on usage determined for the plurality of specified periods in time; and
scheduling delivery of the second chemical product to the second chemical usage facility based on the predetermined time for replenishment respective to the estimated time of exhaustion of the second chemical product.

42. The tangible computer-readable storage medium as defined in claim 41, wherein the scheduling act comprises:
generating a route schedule for delivering the first chemical product to the first chemical usage facility and the second chemical product to the second chemical usage facility based on a comparison between the predetermined time for replenishment of the first chemical product and the predetermined time for replenishment of the second chemical product.

43. The tangible computer-readable storage medium as defined in claim 42, wherein generating a route schedule comprises:
adjusting the route schedule based on a comparison between a location of the first chemical usage facility and a location of the second chemical product.

44. The tangible computer-readable storage medium as defined in claim 40, wherein determining usage comprises:
calculating a quantity of the first chemical product used during each of the specified periods in time by measuring an amount of first chemical product dispensed at the first chemical usage facility during the specified periods in time.

45. The tangible computer-readable storage medium as defined in claim 44, wherein the specified periods in time comprise an initial time period and at least one subsequent time period, wherein predicting an estimated time of exhaustion comprises:
subtracting the quantity of the first chemical product dispensed during the initial time period from an original quantity of the chemical product to render an estimate of remaining chemical product following the initial time period, wherein the estimate of remaining chemical product then represents a relative original quantity for use in estimating remaining chemical product after each of the subsequent time periods; and subtracting the quantity of the first chemical product dispensed during each of the subsequent time periods from the relative original quantity to yield estimates of remaining chemical product following each of the subsequent time periods, wherein the relative original quantity being set to the estimate of remaining chemical product after each subtracting act performed for each subsequent time period.

46. The tangible computer-readable storage medium as defined in claim 45, wherein the predicting act further comprises:

plotting the estimate of remaining chemical product following the initial time period and the estimates of remaining chemical product after each of the subsequent time periods on a time line; and extrapolating the plotted estimates on the time line to estimate the time of exhaustion.

47. The tangible computer-readable storage medium as defined in claim 44, wherein determining usage of a first chemical product comprises determining usage of a first chemical product that is in liquid form.

48. The tangible computer-readable storage medium as defined in claim 44, wherein determining usage of a first chemical product comprises determining usage of a first chemical product is in solid form.

49. The tangible computer-readable storage medium as defined in claim 40, wherein each of the plurality of indirect measurements that relate to a count of wash cycles comprises an instance that a rack is washed by a ware wash machine.

50. The tangible computer-readable storage medium as defined in claim 40, wherein each of the plurality of indirect measurements that relate to a count of wash cycles comprises an instance that a vehicle is washed by a vehicle wash facility.

51. The tangible computer-readable storage medium as defined in claim 40, wherein determining usage further comprises:

multiplying each of the plurality of total count values by a dissolution rate associated with the first chemical product to render a quantity of the first chemical product used at the first chemical usage facility during each of the plurality of specified periods in time.

52. The tangible computer-readable storage medium as defined in claim 51, wherein specified periods in time comprise an initial time period and at least one subsequent time period, wherein predicting an estimated time of exhaustion comprises:

subtracting the quantity of the first chemical product used during the initial time period from an original quantity of the chemical product to render an estimate of remaining chemical product following the initial time period, wherein the estimate of remaining chemical product then represents a relative original quantity for use in estimating remaining chemical product after each of the subsequent time periods; and subtracting the quantity of the first chemical product dispensed during each of the subsequent time periods from the relative original quantity to yield estimates of remaining chemical product after each of the subsequent time periods, wherein the relative original quantity being set to the estimate of remaining chemical product following each subtracting act performed for each subsequent time period.

53. The tangible computer-readable storage medium as defined in claim 52, wherein predicting an estimated time of exhaustion further comprises:

plotting the estimate of remaining chemical product following the initial time period and the estimates of remaining chemical product after each of the subsequent time periods on a time line; and extrapolating the plotted estimates on the time line to estimate the time of exhaustion.

54. The tangible computer-readable storage medium as defined in claim 53, wherein determining usage of a first chemical product comprises determining usage of a first chemical product is in solid form.

55. The tangible computer-readable storage medium as defined in claim 40, wherein the determining a sequential position comprises:

analyzing a delivery parameter.

56. The tangible computer-readable storage medium as defined in claim 55, wherein the delivery parameter relates to minimizing total route distance.

57. The tangible computer-readable storage medium as defined in claim 55, wherein the delivery parameter relates to minimizing total route time.

58. The tangible computer-readable storage medium as defined in claim 40 wherein determining a sequential position comprises:

analyzing one or more sets of traffic related data selected from the group consisting of map data, road condition data, road construction data, and weather data.

59. The tangible computer-readable storage medium as defined in claim 40, wherein the computer process further comprises:

transmitting usage of the first chemical product at the first chemical usage facility during each of the plurality of sped fled periods in time to a central management facility, wherein a server computer at the central management facility performs the predicting and scheduling acts.

60. The tangible computer-readable storage medium as defined in claim 59, wherein scheduling delivery comprises:

modifying a route schedule to include instructions to deliver the first chemical product to the first chemical usage facility.

61. The tangible computer-readable storage medium as defined in claim 60, wherein the computer process further comprises:

transmitting the route schedule to a service vehicle from the central management facility.

* * * * *